(No Model.)

W. C. WISE.
CHURN.

No. 347,020. Patented Aug. 10, 1886.

WITNESSES:
Norris A. Clark

INVENTOR:
William C. Wise

UNITED STATES PATENT OFFICE.

WILLIAM C. WISE, OF LAMONTE, MISSOURI.

CHURN.

SPECIFICATION forming part of Letters Patent No. 347,020, dated August 10, 1886.

Application filed June 8, 1885. Serial No. 168,068. (No model.)

*To all whom it may concern:*

Be it known that I, WILLIAM C. WISE, a citizen of the United States, residing at Lamonte, in the county of Pettis and State of Missouri, have invented certain new and useful Improvements in Churns, of which the following is a specification, reference being had to the accompanying drawings.

My invention relates to churns; and it consists in the details of construction hereinafter described and claimed.

Figure 1:
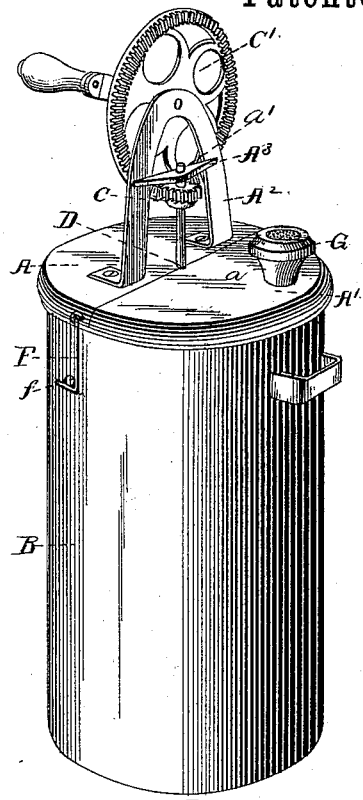
Figure 2:
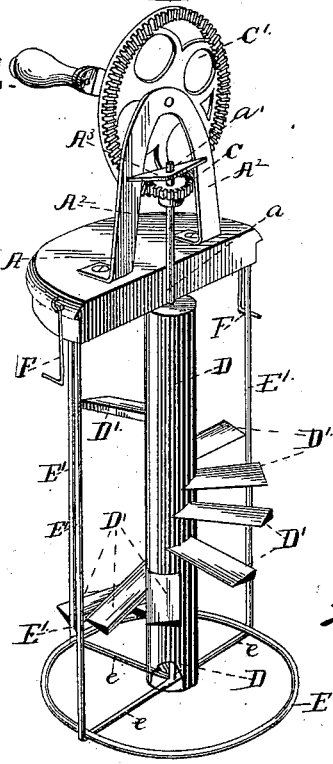

In the drawings, Figure 1 is a perspective view of my churn; and Fig. 2 is a perspective view of the churning attachment, one section of the cover being removed.

The cover is formed of two semicircular sections, A A', provided in their meeting edges with coincident half-round notches which provide a bearing, $a$, for the dasher-shaft. These sections have an outwardly-projected flange at their upper side, which rests on the churn-body B. On the section A, I mount a frame, $A^2$, having a cross-bar, $a'$, in line with the bearing $a$. The dasher-shaft D has its upper end journaled in bearings $a\ a'$, and is provided with a pinion, C, which is meshed with and driven by a gear-wheel, C', journaled to the bearing-frame $A^2$. To the dasher-shaft I fix the radial breaking-arms D', which are arranged in spiral series around said shaft, as shown. By this disposition of the arms the cream is elevated, cut, and dropped as the dasher is revolved, and each arm cuts a portion of the cream, and that which reaches the upper arms is dropped on the cream below, as will be seen. The arms D' are tapered in cross-section and reduced to a knife-edge on their front faces or edges, so as to cut the cream, while their tapering form and spiral arrangement tend to throw the cream upward.

E' represents vertical wire uprights. I provide three of these uprights, but more may be employed, if necessary. The upper ends of said uprights are made fast to the section A of the cover. The lower ends are bent inwardly and extended, as at $e$, forming a support for the wire hoop E. Suitable means may be employed for securely holding the hoop E in place. The extensions unite in the center of hoop E, and at this point I provide a pivot, as most convenient, upon which is mounted the lower end of dasher-shaft D.

The base-frame is preferably a wire hoop, and the wire uprights are bent under and extended at $e$ to the center of the frame. I prefer to employ three of these uprights, as shown, as thereby the frame will be firmly braced. More may be used, if desired. By these described constructions it will be seen the bearing in the bottom of the churn-body is dispensed with and the churning attachment may be conveniently applied to any ordinary vessel.

The section A of the cover has two or more hooks, F, arranged to engage studs $f$ on the body B, in order to hold the parts rigidly together. The cover-section A' has a knob or handle, G, by which it may be raised to gain access to the cream while churning.

I am aware that churns have been made with base-frame and uprights forming a receiver for dasher and brake-arms, and with mechanism for operating them, and therefore do not wish to claim the same, broadly; but What I do claim, and desire to secure by Letters Patent, is—

The combination, with the churn body and cover, of wire uprights E', secured at their upper ends to the cover and bent inwardly at their lower ends, as at $e$, a hoop supported on the inturned ends of the uprights and holding them in position, a dasher supported upon the inturned ends of the uprights at its lower end, and mechanism for operating said dasher, substantially as set forth.

In testimony whereof I affix my signature in presence of two witnesses.

WILLIAM C. WISE.

Witnesses:
SAMUEL R. DAVIS,
IRA SWEET.